(12) United States Patent
Telukuntla

(10) Patent No.: US 7,515,704 B2
(45) Date of Patent: Apr. 7, 2009

(54) METHOD, APPARATUS AND ARTICLES INCORPORATING A STEP SIZE CONTROL TECHNIQUE FOR ECHO SIGNAL CANCELLATION

(76) Inventor: Krishna Prabhu N. V. R. Telukuntla, #1170, 18th A Main Road, 2$^{nd}$ B Cross Road, 2$^{nd}$ phase, J.P. Nagar, Bangalore (IN)

( * ) Notice: Subject to any disclaimer, the term of this patent is extended or adjusted under 35 U.S.C. 154(b) by 879 days.

(21) Appl. No.: 10/855,067

(22) Filed: May 27, 2004

(65) Prior Publication Data

US 2005/0147235 A1 Jul. 7, 2005

Related U.S. Application Data

(60) Provisional application No. 60/534,268, filed on Jan. 5, 2004.

(51) Int. Cl.
*H04M 9/08* (2006.01)
(52) U.S. Cl. .............................. 379/406.14; 379/406.01
(58) Field of Classification Search ............ 379/406.01, 379/406.14
See application file for complete search history.

(56) References Cited

U.S. PATENT DOCUMENTS

2004/0264686 A1* 12/2004 Enzner .................. 379/406.08

OTHER PUBLICATIONS

Rainer Martin, 'Noise Power Spectral Density Estimation Based on Optimal Smoothing and Minimum Statistics', Jul. 2001, IEEE Trqansactions on Speech and Audio Processing, vol. 9, No. 5, pp. 504-512.*

* cited by examiner

*Primary Examiner*—Alexander Jamal
(74) *Attorney, Agent, or Firm*—Ash Tankha

(57) ABSTRACT

A novel technique for canceling echo signal in teleconferencing applications. In one example embodiment, a low complexity double-talk and noise robust frequency domain adaptive filter is used to cancel the echo signal during the teleconferencing applications. The adaptive filter computes step sizes using power spectral density functions of error and far end signals using an equation, which does not require a single talk/double detectors and a voice activity detector. The computed step sizes are then used by the adaptive filter (PBFDAF) to cancel the echo signal.

20 Claims, 3 Drawing Sheets

METHOD, APPARATUS AND ARTICLES INCORPORATING A STEP SIZE CONTROL TECHNIQUE FOR ECHO SIGNAL CANCELLATION

This application claims priority under 35 USC § 119 (e) (1) of provisional application No. 60/534268, Filed on Jan. 5, 2004.

TECHNICAL FIELD OF THE INVENTION

The present invention relates generally to communication systems and more particularly to a digital echo signal canceller used in a bidirectional communication link.

BACKGROUND OF THE INVENTION

Many adaptive filtering techniques based on time domain and frequency domain have been used to solve the problem of echo signal cancellation in teleconferencing applications. The simplest time domain technique currently prevalent is NLMS (Normalized Least Mean Square), which has the order of complexity directly proportional to the square of the filter length. Another time domain technique that is used is a block LMS technique, which works on blocks of samples for filtering and adaptation. The complexity of the block LMS has been significantly reduced by time domain convolution transforming into multiplication in frequency domain. The frequency domain implementation results in a similar output, given by the time domain block LMS, with reduced complexity and hence called the fast block LMS (FBLMS). The reduced complexity is achieved by making the block length equal to the filter length, i.e., the filtering and the adaptation are done for every filter length sample. This generally introduces a delay, which is equal to the filter length. In teleconferencing applications where the echo reverberation times are generally large, a large filter is required to cover an entire echo signal. Therefore, when the FBLMS filter is used in such applications the delay introduced can be large and is generally not acceptable in real-time applications.

Partitioned block frequency domain adaptive filter (PBFDAF) solves the problem of high computational complexity of time domain techniques and large delays of frequency domain techniques. The PBFDAF module achieves this by partitioning the filter into multiple non-overlapping smaller sub-filters. Therefore, a balance between the delay and the computational complexity can be achieved by using the PBFDAF. The error signal between the actual echo signal and the echo signal estimated by the PBFDAF is used for the updation of the PBFDAF. This updation of the PBFDAF requires choosing a step-size μ.

Choosing a fixed step size can make the adaptive filter very unstable in the presence of a near end speech and/or a background noise. A control algorithm, which takes the decision to continue or inhibit the adaptation, is required for a stable and efficient operation of the adaptive filter in the presence of the near end speech and/or the background noise. This is normally done by controlling the step-size μ of the adaptive filter. Many of the current techniques used to control the step size μ, during a double talk and the background noise, in both the time and frequency domain adaptive filters are computationally very complex.

In addition, separate detection algorithms are required to detect single talk and double talk in a bidirectional communication link. Further, a background noise estimator is required when running in noisy condition, and a voice activity detector is needed for estimating the background noise. Detection of non-stationary noise is generally difficult even when using a good voice activated detector (VAD). In case of a failure of a correct background noise estimate, the adaptive filter can become unstable or it may not converge effectively to suppress the echo signal. A more robust step size control algorithm is required in such scenarios.

SUMMARY OF THE INVENTION

The present subject matter provides a low complexity echo signal cancellation technique for teleconferencing applications. In one example embodiment, a robust adaptive filter computes step sizes using power spectral density functions of error and far end signals using an equation, which does not require a single talk/double detectors or a voice activity detector. The computed step sizes are then used by the adaptive filter to cancel the echo signal.

DETAILED DESCRIPTION OF THE INVENTION

The present subject matter provides a novel technique to cancel echo signal in a bidirectional communication link. In one example embodiment, a low complexity algorithm is used to compute step sizes. The step sizes are then used by an adaptive filter working in the frequency domain to cancel the echo signal during the bidirectional communication link.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
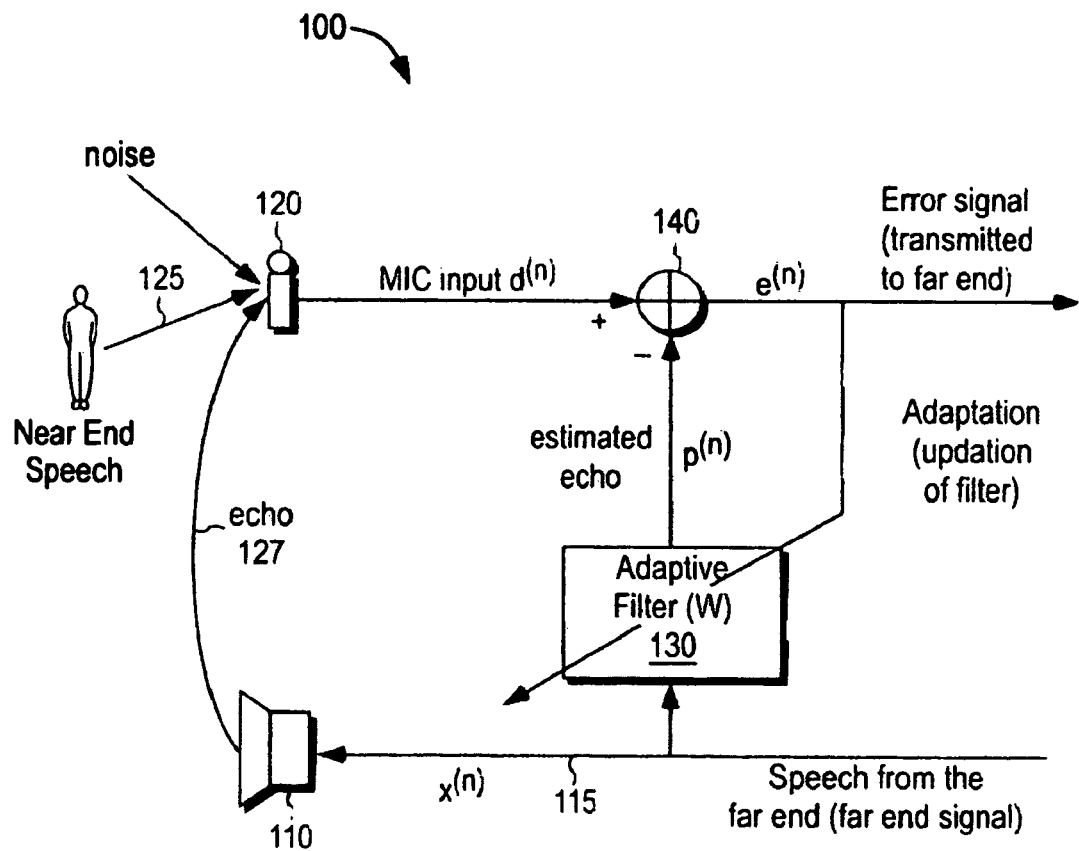
FIG. 1 illustrates a block diagram of using an adaptive filter for canceling echo signal arising in a typical speakerphone application.

FIG. 1 illustrates a block diagram 100 of an adaptive filter in operation used to remove an acoustic echo signal formed due to a leakage path between a speaker and microphone in a typical teleconferencing application. As shown in FIG. 1, the block diagram 100 illustrates a loud speaker 110 for delivering far end speech $x^{(n)}$, a microphone (MIC) 120 for picking up near end speech 125 and output a near end MIC signal $d^{(n)}$, an adaptive filter 130, and a subtractor 140.

In operation, during a teleconferencing application, the loud speaker 110 is excited with the speech $x^{(n)}$ 115 coming from a far end. The MIC 120 placed to pick-up the speech from the near end 125, can also pick up a portion of the signal propagated by the loud speaker 110, either directly via the leakage path 127 or through reflections from the near end objects or walls. Since the MIC signal $d^{(n)}$ is transmitted to the far end, a portion of the far end speech also goes with the near end speech as echo signal. In such a scenario, a control algorithm and an adaptive filter are used to estimate and filter out the echo signal from the MIC signal $d^{(n)}$ to deliver a pure near end speech. This is generally done by subtracting the estimated echo signal using the subtractor 140 from the MIC signal $d^{(n)}$ as outlined in the following equation:

$$e^{(n)} = d^{(n)} - p^{(n)}$$

wherein $p^{(n)} = w^{(n)} * x^{(n)}$, an estimated echo signal by the adaptive filter, * indicates a convolution operation, $w^{(n)}$ is the adaptive filter and n stands for a block index in time.

The error signal is then used to update the adaptive filter $w^{(n)}$, i.e., $$w^{(n+1)} = w^{(n)} + \mu f(e^{(n)}, x^{(n)})$$

wherein $f(\ )$ is a function of $e^{(n)}$ and $x^{(n)}$, $\mu$ is a weighting term, called the step size.

The above outlined equations are used iteratively to reduce the error signal '$e^{(n)}$' between $d^{(n)}$ and $p^{(n)}$.

It can be seen from the above equations that when there is a linear path existing between the loud speaker and the microphone, when there is no noise, and when there is no near end speech entering the microphone (i.e. the microphone signal contains only the echo signal), the adaptive filter, provided with sufficient length, can remove the echo signal. But in real-world practical applications, the MIC signal $d^{(n)}$ not only contains the echo signal, but also the near end speech and the background noise.

Figure 2:
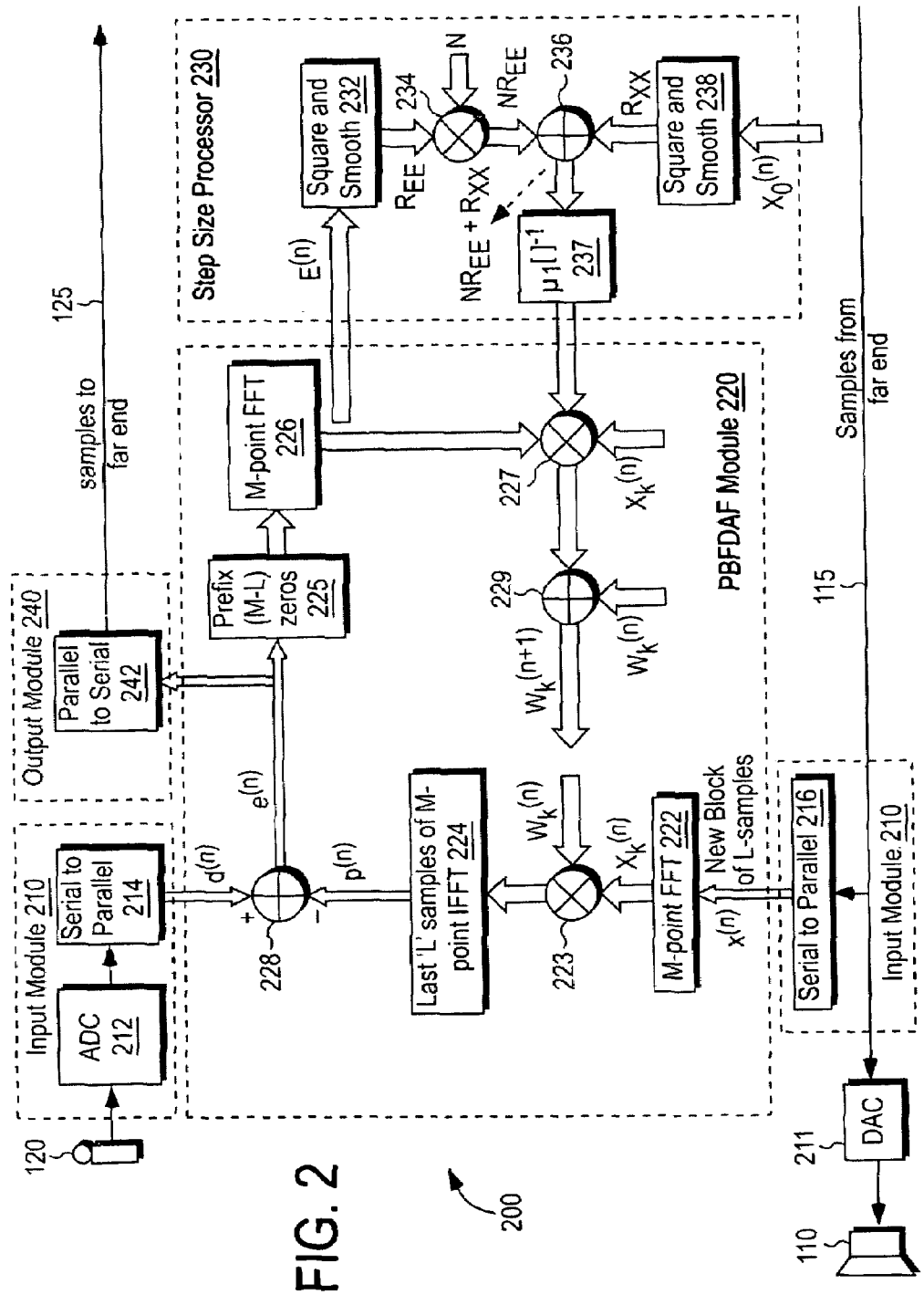
FIG. 2 is a block diagram illustrating using a step size control for PBFDAF to cancel echo signal in a speaker-phone application according to the embodiments of the present invention.

FIG. 2 is a block diagram 200 illustrating using the step size control for partitioned block frequency domain adaptive filter (PBFDAF) to cancel echo signal in a speakerphone application according to the embodiments of the present invention. The block diagram 200 shown in FIG. 2 illustrates a speaker 110 and its associated digital-to-analog converter (DAC) 211, a microphone (MIC) 120, an input module 210, a PBFDAF module 220, a step size processor 230, and an output module 240.

As shown in FIG. 2, the input module 210 includes an ADC 212 and serial-to-parallel converters 214 and 216. The PBFDAF module 220 includes a first M-point FFT module 222, a first multiplier 223, an M-point IFFT module 224, a subtractor 228, a prefix (M-L) zeros module 225, a second M-point FFT module 226, a second multiplier 227, and a first adder 229, respectively. The step size processor 230 includes a first square and smooth module 232, a third multiplier 234, a second adder 236, a second square and smooth module 238, and an inverse function module 237.

In operation, in one example embodiment, the ADC 212 receives near end signal along with echo signal and background noise from MIC 120 and converts the composite signal into a sequence of digital samples in time domain. In some embodiments, the ADC receives the near speech signal along with the echo signal and the background noise and converts the composite signal into the sequence of digital samples in time domain. The serial-to-parallel converter 214 then receives the digital samples in time domain and converts it to blocks of samples in time domain $d^{(n)}$. The blocks of samples in time domain corresponding to a block n of length L can be represented as follows:

$$d^{(n)} = [d(nL+1), d(nL+2), \ldots, d(nL+L)]$$

The serial-to-parallel converter 216 receives a sequence of digital samples in time domain from a far end as shown in FIG. 2 and converts the sequence of digital samples to blocks of far end digital samples in time domain $x^{(n)}$. In some embodiments, the serial-to-parallel converter 216 receives a sequence of digital samples in time domain from the far end and converts the sequence of digital samples to blocks of far end speech digital samples in time domain $x^{(n)}$. The corresponding received blocks of the far end digital samples in time domain can be represented as follows:

$$x^{(n)} = [x(nL+1), x(nL+2), \ldots, x(nL+L)]$$

The first M-point FFT module 222 then receives the above blocks of far end digital samples in time domain and converts it to far end digital samples in frequency domain (all the following corresponding digital samples in frequency domain is represented in capital letters). The corresponding converted far end digital samples for the excitation $x^{(n)}$, in frequency domain $X_k^{(n)}$ corresponding to block n can be represented as:

$$X_k^{(n)} = FFT([x((n+1)L-kP-M+1)x((n+1)L-kP-M+2) \ldots x((n+1)L-kP)])$$

wherein $k=0, \ldots, N-1$ and N being the number of filter partitions and P is the partition length or the subfilter length of the PBFDAF module 220.

The first multiplier 223 then estimates the echo signal in the frequency domain by multiplying the far end digital samples in frequency domain excitation $X_k^{(n)}$ with the PBFDAF filter coefficients, $W_k^{(n)}$. The estimated echo signal in frequency domain, $P^{(n)}$, corresponding to a block n is computed using the equation:

$$P^{(n)}(j) = X_0^{(n)}(j)W_0^{(n)}(j) + X_1^{(n)}(j)W_1^{(n)}(j) + \ldots + X_{N-1}^{(n)}(j)W_{N-1}^{(n)}(j)$$

wherein $j=0, \ldots, M-1$ (j stands for a frequency bin or an FFT coefficient)

The M-point IFFT module 224 then obtains the estimated echo signal in time domain by taking the last L samples of the inverse FFT of the estimated echo signal in the frequency domain. The time domain estimated echo signal corresponding to the block n, $p^{(n)}$, is computed using the equation:

$$p^{(n)} = \text{Last } L \text{ values of } (IFFT(P^{(n)}))$$

wherein IFFT is defined as:

$$w(m) = IFFT(W(m)) = \frac{1}{M} \sum_{i=0}^{M-1} W(i) e^{-j\frac{2\pi im}{M}}, m = 0, \ldots M-1$$

In some embodiments, the power spectral density function of the far end signal is computed by receiving the far end signal 115. Far end blocks of samples are then formed using the received far end signal. An FFT is then performed on the far end blocks of samples to obtain a frequency domain far end signal. The power spectral density function of the far end signal is then computed using the obtained frequency domain far end signal.

In these embodiments, the power spectral density function of the error signal is computed by estimating the echo signal by the PBFDAF using the far end signal. Time domain samples of the estimated echo signal is then obtained. A time domain-error signal is then outputted by subtracting the time domain samples of the estimated echo signal from the microphone signal. A frequency domain-error signal is then obtained by performing an FFT on the time domain-error signal. The power spectral density function of the error signal is then computed using the obtained frequency domain-error signal. Also in these embodiments, the PBFDAF coefficients are multiplied with the frequency domain far end signal to output a frequency domain estimated echo signal. An IFFT is then performed on the frequency domain estimated echo signal to obtain the time domain samples of the estimated echo signal.

The subtractor 228 then obtains the time domain error signal by subtracting the estimated echo signal $p^{(n)}$ from the MIC input $d^{(n)}$, i.e., $$e^{(n)} = d^{(n)} - p^{(n)}$$

The prefix (M-L) zeros module 225 then prefixes (M-L) zeros to the above computed time domain error signal.

The second M-point FFT module 226 then obtains error signal in frequency domain by taking the M-point FFT of a combined vector with (M-L) zeros and 'L' samples of error signal using the prefix (M-L) zeros module 225, as follows:

$$E^{(n)} = FFT([000 \ldots 0]e^{(n)}), \text{ the length of } [000 \ldots 0] \text{ is M-L}$$

The second multiplier 227 and the first adder 229 then receive the above estimated error signal in frequency domain $E^{(n)}$ and obtain the updation filter coefficients as follows:

$$W_k^{n+1}(j) = W_k^n(j) + \mu^{(n)}(j)(X_k^{(n)}(j))^* E^{(n)}(j)$$

wherein j=0, ... M−1, (j stands for a frequency bin or an FFT coefficient), and k=0, ... N−1, for all the N partitions or subfilters of the PBFDAF, $\mu$ is the key factor to be computed for a stable operation of the PBFDAF module 220. As the error signal can contain both the background noise and the near end speech along with the echo signal, it cannot take the same value when there is no background noise and/or near-speech. It must be reduced appropriately when the echo signal is corrupted by the background noise and has to be made zero when the echo signal is corrupted by the near-end speech. The key factor $\mu$ is computed using the equation:

$$\mu^{(n)}(j) = \mu_1 [R_{XX}^{(n)}(j) + NR_{EE}^{(n)}(j)]^{-1}$$

wherein $\mu_1$ is chosen a value of less than 1/N. The step size processor 230 then computes the required step sizes as follows:

The first square and smooth module 232 receives the error signal in frequency domain and computes the power spectral density function of the error signal $R_{EE}$, by squaring and smoothing the frequency domain error signal using the equation:

$$R_{EE}^{(n)}(j) = \lambda R_{EE}^{(n-1)}(j) + (1-\lambda)|E^{(n)}(j)|^2$$

wherein n is the block index, j stands for the frequency bin index, and $\lambda$ is a smoothing constant having a value in the range of about 0 and 1.

The second square and smooth module 238 then receives the far end signal in frequency domain and computes the power spectral density function of the far end signal $R_{XX}$, by squaring and smoothing the frequency domain far end signal using the equation:

$$R_{XX}^{(n)}(j) = \lambda R_{XX}^{(n-1)}(j) + (1-\lambda)|X_0^{(n)}(j)|^2$$

wherein n is the block index, j stands for the frequency bin index, and $\lambda$ is a smoothing constant having a value in the range of about 0 and 1.

The second adder 236 then adds the above computed power spectral density function $R_{XX}$, to the output of the third multiplier 234, which multiplies the power spectral density function of error signal, $R_{EE}$ with the number of filter partitions of PBFDAF, N. The inverse function module 237 receives the output of the second adder 236, $(NR_{EE}+R_{XX})$ and computes the required step size $\mu$, by inversing $(NR_{EE}+R_{XX})$ and multiplying the inverse with $\mu_1$ by choosing a value chosen less than (1/N).

The computed $\mu$ then provides the necessary step factor control for an unconstrained PBFDAF module. The above equation can also be used to compute $\mu$ for the constrained PBFDAF module and for both constrained and unconstrained FDAFs also.

The second multiplier 227 then multiplies the above computed step size $\mu$ with the frequency domain far end signal and the frequency domain error signal to obtain correction coefficients. The first adder 229 then adds the correction coefficients to the filter coefficients of PBFDAF to obtain the updated filter coefficients. Thus, the filter is protected using the computed step size $\mu$. The above-described process is repeated iteratively using next blocks of samples from the microphone and far end signals until the echo signal is substantially reduced from the microphone signal.

It can be envisioned that the above illustrated step size control for partitioned block frequency domain adaptive filter (PBFDAF) to cancel the echo signal can be part of a centralized system, wherein the microphone signal can be transmitted to the centralized system to cancel the echo signal. In such a system, the PBFDAF module 220 and the step size processor 230 can interface with the microphone via a channel carrying the microphone signal.

Figure 3:
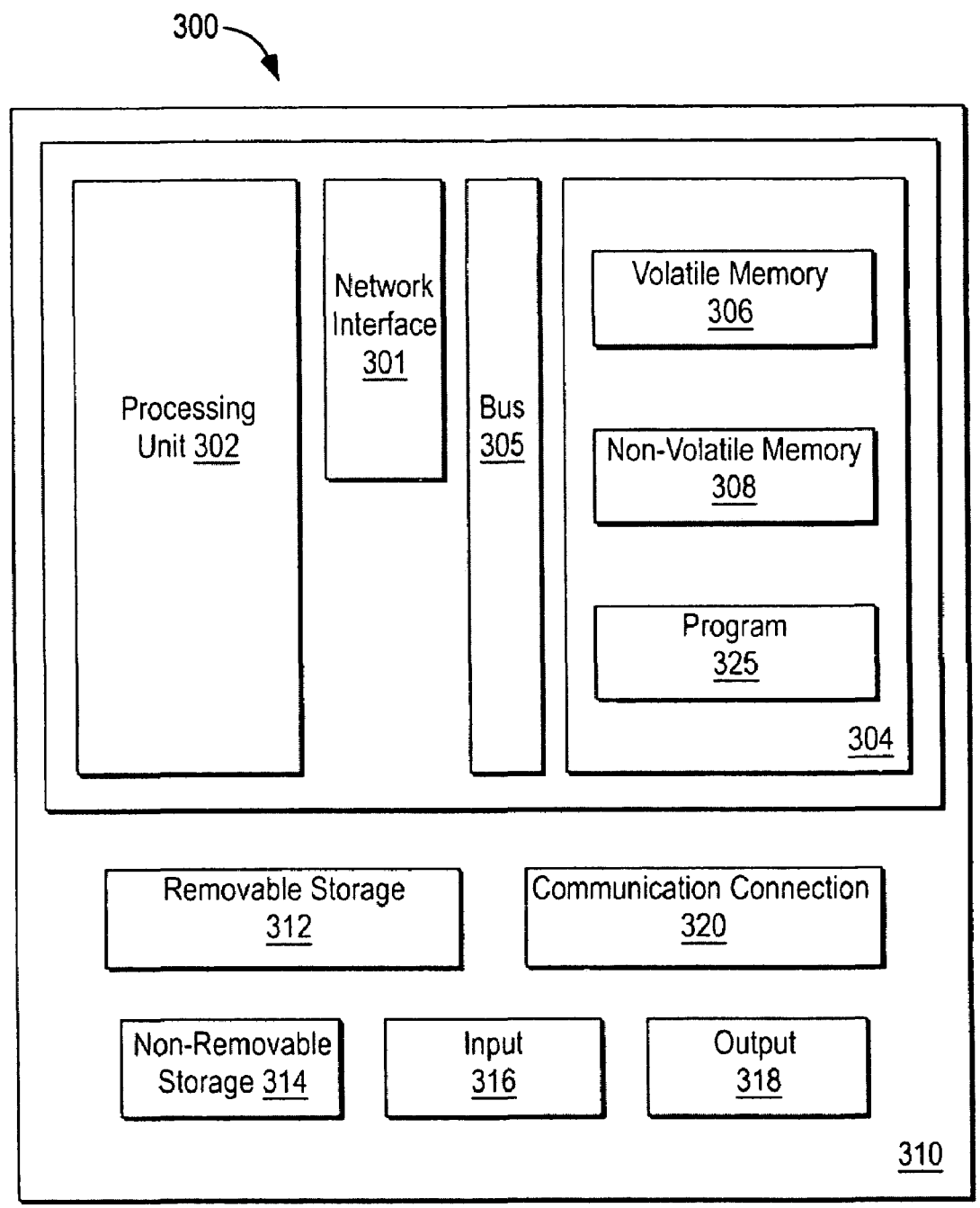
FIG. 3 is an example of a suitable computing environment for implementing embodiments of the present invention.

FIG. 3 shows an example of a suitable computing system environment for implementing embodiments of the present invention. FIG. 3 and the following discussion are intended to provide a brief, general description of a suitable computing environment in which certain embodiments of the inventive concepts contained herein may be implemented.

A general computing device, in the form of a computer 310, may include a processing unit 302, memory 304, removable storage 312, and non-removable storage 314. Computer 310 additionally includes a bus 305 and a network interface (NI) 301.

Computer 310 may include or have access to a computing environment that includes one or more input elements 316, one or more output elements 318, and one or more communication connections 320 such as a network interface card or a USB connection. The computer 310 may operate in a networked environment using the communication connection 320 to connect to one or more remote computers. A remote computer may include a personal computer, server, router, network PC, a peer device or other network node, and/or the like. The communication connection may include a Local Area Network (LAN), a Wide Area Network (WAN), Wireless Network (Wireless LAN), and/or other networks.

The memory 304 may include volatile memory 306 and non-volatile memory 308. A variety of computer-readable media may be stored in and accessed from the memory elements of computer 310, such as volatile memory 306 and non-volatile memory 308, removable storage 312 and non-removable storage 314. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital video disks (DVDs), diskettes, magnetic tape cartridges, memory cards, Memory Sticks™, and the like; chemical storage; biological storage; and other types of data storage.

"Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments of the present invention may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 302 of the computer 310. For example, a computer program 325 may comprise machine-readable instructions capable canceling the echo signal in a bidirectional communication link according to the teachings and herein described embodiments of the present invention. In one embodiment, the computer program 325 may be included on a CD-ROM and loaded from the CD-ROM to a hard drive in non-volatile memory 308. The machine-readable instructions cause the computer 310 to cancel the echo signal in a bidirectional communication link according to some embodiments of the present invention.

The above technique does not require separate detection algorithms for single talk and double talk. Generally, detection of non-stationary noise is difficult even when using a good voice activity detector (VAD). In addition, the above-described technique does not require estimating background noise and use of a voice activity detector for estimating the background noise. The prior-art technique becomes unstable and may not converge in case of a failure in detecting/estimating the background noise. The present invention overcomes these shortcomings in the prior art techniques to correct for echo signal.

The above description is intended to be illustrative, and not restrictive. Many other embodiments will be apparent to those skilled in the art. The scope of the invention should therefore be determined by the appended claims, along with the full scope of equivalents to which such claims are entitled.

The invention claimed is:

1. A method for cancelling an echo signal in a bidirectional communications link comprising:
   computing step sizes using power spectral density function of an error signal and a power spectral density function of a far end signal using the equation:

$$\mu^{(n)}(j) = \mu_1 [R_{XX}^{(n)}(j) + NR_{EE}^{(n)}(j)]^{-1}$$

wherein $\mu_1$ is a value less than 1/N, N being a number of sub filters used in a partitioned block frequency domain adaptive filter (PBFDAF), n is a block index, $R_{XX}$ is the power spectral density function of the far end signal, $R_{EE}$ is the power spectral density function of the error signal, and j is an index to a frequency-bin; and
   applying the computed step sizes to the N sub filters in the PBFDAF to cancel an echo signal.

2. The method of claim 1, wherein computing the power spectral density function of the far end signal comprises:
   receiving the far end signal;
   forming far end blocks of samples from the received far end signal;
   performing an FFT on the far end blocks of samples and obtaining a frequency domain far end signal; and
   computing power spectral density function of the far end signal using the obtained frequency domain far end signal.

3. The method of claim 2, wherein computing the power spectral density function of the error signal comprises:
   estimating echo signal by the PBFDAF from the far end signal;
   obtaining time domain samples of the estimated echo signal;
   subtracting time domain samples of the estimated echo signal from the microphone signal and outputting a time domain-error signal;
   performing FFT on the time domain-error signal for obtaining a frequency domain-error signal; and
   computing power spectral density function of the error signal using the obtained frequency domain error signal.

4. The method of claim 3, wherein applying the step sizes comprises:
   multiplying the computed step sizes with the frequency domain error signal and the frequency domain far end signal to obtain a correction coefficient; and
   obtaining adapted PBFDAF coefficients by adding the correction coefficient to PBFDAF coefficients associated with adaptive filters in the PBFDAF.

5. The method of claim 4, wherein obtaining the time domain samples of the estimated echo signal comprises:
   multiplying the adapted PBFDAF coefficients with the frequency domain far end signal to output a frequency domain estimated echo signal; and
   performing IFFT on the frequency domain estimated echo signal to obtain the time domain samples of the estimated echo signal.

6. The method of claim 5, further comprising: receiving the microphone signal; and
   forming current near end blocks of samples from the microphone signal.

7. The method of claim 1, further comprising:
   repeating the computing and applying steps for a next far end and near end blocks of samples.

8. A method of echo signal cancellation in a bidirectional communication link comprising:
   computing step sizes using power spectral density functions of an error signal and a power spectral density function of a far end signal using the equation:

$$\mu^{(n)}(j) = \mu_1 [R_{XX}^{(n)}(j) + NR_{EE}^{(n)}(j)]^{-1}$$

wherein $\mu_1$ is a value Less than 1/N, N being a number of sub filters used in a partitioned block frequency domain adaptive filter (PBFDAF), n is a block index, $R_{XX}$ is the power spectral density function of the far end signal, $R_{EE}$ is the power spectral density function of the error signal, and j is an index to a frequency-bin;
   applying the computed step sizes to the N sub filters in the PBFDAF; and
   repeating above steps until the echo signal is canceled.

9. The method of claim 8, wherein the power spectral density function of the far end signal $R_{XX}$ is computed using the equation:

$$R_{XX}^{(n)}(j) = \lambda R_{XX}^{(n-1)}(j) + (1-\lambda)|X_0^{(n)}(j)|^2$$

wherein $\lambda$ is a smoothing constant having a chosen value in the range of about 0 and 1.

10. The method of claim 9, wherein the power spectral density functions of the error signal $R_{EE}$ is computed using the equation:

$$R_{EE}^{(n)}(j) = \lambda R_{EE}^{(n-1)}(j) + (1-\lambda)|E^{(n)}(j)|^2$$

wherein λ is a smoothing constant having a chosen value in the range of about 0 and 1.

11. A apparatus for echo signal cancellation in a bidirectional communication link, comprising:
an input module to receive a far end signal, wherein the input module to form a far end blocks of samples from the far end speech signal, and wherein the input module to further receive a MIC signal including a near end signal, an echo signal, and a background noise;
a step size processor for computing step sizes using the equation:

$$\mu^{(n)}(j)=\mu_1[R_{XX}^{(n)}(j)+NR_{EE}^{(n)}(j)]^{31\ 1}$$

wherein $\mu_1$ is chosen a value less than 1/N, N is a number of sub filters, n is a block index, $R_{XX}$ is a power spectral density function of the far end signal, $R_{EE}$ is a power spectral density function of the error signal, and j is an index to a frequency-bin;
a PBFDAF module with N sub filters coupled to the step size processor and input module to receive the computed step sizes and use the step sizes to update PBFDAF coefficients associated with adaptive filters in the PBFDAF to substantially remove the echo signal from the microphone signal; and
an output module coupled to the PBFDAF module to output a substantially pure near end speech signal.

12. The apparatus of claim 11, wherein the PBFDAF module multiplies the computed step sizes with error signal and the far end signal to obtain correction coefficients, and wherein the PBFDAF module adds the obtained correction coefficients to the associated PBFDAF coefficients.

13. The apparatus of claim 12, wherein the PBFDAF module subtracts time domain samples of an estimated echo signal by the PBFDAF module from a current block of samples obtained from a near end microphone signal and outputs a time domain-error signal, wherein the PBFDAF module performs an FFT on the time domain-error signal for obtaining a frequency domain error signal, wherein the PBFDAF module obtains far end signal from a current block of far end samples, and wherein the step size processor computes power spectral density functions of the error and far end signals using the obtained error signal and the far end speech signals obtained from the current block of far end samples.

14. An echo canceller for a bidirectional communication link comprising:
a storage medium having instructions that, when executed by a computing platform, result in execution of a method comprising:
computing step sizes using power spectral density function of an error signal and a power spectral density function of a far end signal using the equation:

$$\mu^{(n)}(j)=\mu_1[R_{XX}^{(n)}(j)+NR_{EE}^{(n)}(j)]^{-1}$$

wherein $\mu_1$ is a value less than 1/N, N being a number of sub filters used in a partitioned block frequency domain adaptive filter (PBFDAF), n is a block index, $R_{XX}$ is the power spectral density function of the far end signal, $R_{EE}$ is the power spectral density function of the error signal, and j is an index to a frequency-bin; and
applying the computed step sizes to the N sub filters in the PBFDAF to cancel an echo signal.

15. The echo canceller for a bidirectional communications link of claim 14, wherein computing the power spectral density function of the far end signal comprises:
receiving the far end signal;
forming far end blocks of samples from the received far end signal;
performing an FFT on the far end blocks of samples and obtaining a frequency domain far end signal; and
computing power spectral density function of the far end signal using the obtained frequency domain far end signal.

16. The echo canceller for a bidirectional communications link of claim 15, wherein computing the power spectral density function of the error signal comprises:
estimating echo signal by the PBFDAF from the far end signal;
obtaining time domain samples of the estimated echo signal;
subtracting time domain samples of the estimated echo signal from the microphone signal and outputting a time domain-error signal;
performing FFT on the time domain-error signal for obtaining a frequency domain-error signal; and
computing power spectral density function of the error signal using the obtained frequency domain error signal.

17. The echo canceller for a bidirectional communications link of claim 16, wherein applying the step sizes comprises:
multiplying the computed step sizes with the frequency domain error signal and the frequency domain far end signal to obtain a correction coefficient; and
obtaining adapted PBFDAF coefficients by adding the correction coefficient to PBFDAF coefficients associated with adaptive filters in the PBFDAF.

18. The echo canceller for a bidirectional communications link of claim 17, wherein obtaining the time domain samples of the estimated echo signal comprises:
multiplying the adapted PBFDAF coefficients with the frequency domain far end signal to output a frequency domain estimated echo signal; and
performing IFFT on the frequency domain estimated echo signal to obtain the time domain samples of the estimated echo signal.

19. The echo canceller for a bidirectional communications link of claim 18, further comprising:
receiving the microphone signal; and
forming current near end blocks of samples from the microphone signal.

20. The echo canceller for a bidirectional communications link of claim 14, further comprising:
repeating the computing and applying steps for a next set of far end and near end blocks of samples.

* * * * *